United States Patent
Butts et al.

(10) Patent No.: US 6,233,542 B1
(45) Date of Patent: *May 15, 2001

(54) SERVER AND TERMINAL EMULATOR FOR PERSISTENT CONNECTION TO A LEGACY HOST SYSTEM WITH RESPONSE TIME MONITORING

(75) Inventors: Thomas H. Butts, Wills Point; Stuart H. Burris, Jr., Garland; Marty R. Williams, Highland Village, all of TX (US)

(73) Assignee: Openconnect Systems Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/182,685

(22) Filed: Oct. 30, 1998

Related U.S. Application Data

(63) Continuation-in-part of application No. 09/069,522, filed on Apr. 29, 1998, which is a continuation of application No. 08/625,109, filed on Apr. 1, 1996, now Pat. No. 5,754,830.

(51) Int. Cl.[7] .................................................. G06F 9/455
(52) U.S. Cl. ........................ 703/27; 709/311; 710/105; 370/466; 370/469
(58) Field of Search .................... 703/27, 26, 23; 709/246, 218, 206, 203, 227, 228, 313, 311; 705/9; 707/1; 370/466, 469; 710/105

(56) References Cited

U.S. PATENT DOCUMENTS

| | | |
|---|---|---|
| 5,228,137 | 7/1993 | Kleinerman ............................ 703/26 |
| 5,475,836 | 12/1995 | Harris et al. ......................... 709/206 |
| 5,485,369 | 1/1996 | Nicholls et al. ......................... 705/9 |
| 5,497,463 | 3/1996 | Stein et al. ............................ 709/203 |
| 5,530,852 | 6/1996 | Meske, Jr. et al. .................. 709/206 |
| 5,568,612 | 10/1996 | Barrett et al. ........................ 709/203 |
| 5,600,833 | 2/1997 | Senn et al. ................................ 707/1 |
| 5,617,540 | 4/1997 | Civanlar et al. ...................... 709/227 |
| 5,619,650 | 4/1997 | Bach et al. ............................ 709/246 |
| 5,634,006 | 5/1997 | Baugher et al. ...................... 709/228 |
| 5,634,127 | 5/1997 | Cloud et al. .......................... 709/313 |
| 5,636,371 | 6/1997 | Yu .......................................... 703/26 |
| 5,754,830 | * 5/1998 | Butts et al. ........................... 709/311 |

OTHER PUBLICATIONS

"Mobile Telescript Agents and the Web", by P. Domel, COMPCON '96 IEEE Computer Society International, 1996, pp. 52–57.

"Java Security: From HotJava to Netscape and Beyond", by Dean, et al., Security and Privacy 1996 IEEE Symposium, Feb. 1996, pp. 190–200.

(List continued on next page.)

*Primary Examiner*—Kevin J. Teska
*Assistant Examiner*—Russell W. Frejd
(74) *Attorney, Agent, or Firm*—Baker Botts L.L.P.

(57) ABSTRACT

A computer network environment (10) allowing connection of a client system (36) to a legacy host system (18,19) using a server (26) is provided. The computer network environment (10) includes a legacy host system (18,19) having TCP/IP connectivity. The legacy host system (18,19) is operable to support a terminal session for access to the legacy host system (18,19). The computer network environment (10) also includes a server (26) operable to communicate with the legacy host system (18,19) across a persistent TCP/IP socket connection (30). The computer network environment (10) further includes a client system (36) executing an applet process (42) under a web browser (38). The applet process (42) is operable to communicate with the client thread (28) across another persistent TCP/IP socket connection (44) and is operable to provide a terminal session to a user of the client system (36). This terminal session is supported by a persistent connection allowing real-time bidirectional communication with the legacy host system (18,19), including response time monitoring, enabled by appropriate response time monitoring tool executing on host system 18 and appropriate protocol conversions at server (26).

35 Claims, 2 Drawing Sheets

OTHER PUBLICATIONS

"Mobile Intelligent Agent Systems: WAVE vs. JAVA", by Vuong, et al., Emerging Technologies and Applications in Communication, 1996 IEEE Conference, Mar. 1996, pp. 196–199.

"Java and the Shift to Net–Centric Computing", by M. Hamilton, IEEE Computer Magazine, Aug. 1996, pp. 31–39.

"Java, the Web, and Software Development", by E. Yourdon, IEEE Computer Magazine, Aug. 1996, pp. 25–30.

"Interoperable Object Models for Large Scale Distributed Systems", by Newell, et al., IEE Colloq. No. 184: Client/Server Computing Seminer Proceedings, 1995, pp. 14/1–14/6.

"Multiple Service Integration Confronted with Legacy Systems," by Louis Perrochon, Contribution to the Workshop Offering the same information via multiple services of the First International Conference on the World–Wide Web, Geneva, May 1994.

"Translation Servers: Gateways Between Stateless and Stateful Information Systems," by Louis Perrochon, located on the World–Wide Web, 1994.

"IDLE: Unified W3–Access to Interactive Information Servers," by Louis Perrochon, Roman Fischer, Computer Networks and ISDN Systems 27 (1995), pp. 927–938.

Amitabh Dave, Mohlalefi Sefika and Roy H. Campbell, "Proxies, Application Interfaces, and Distributed Systems," *Proc. 2nd Intl. Conf. on Object Orientation in Operating Systems*, Sep. 24–25, 1992, Dourdan, France.

Venkata N. Padmanabhan, Jeffrey C. Mogul, "Improving HTTP Latency, "Computer Networks and ISDN Systems 28 (1995), pp. 25–35.

Jeffrey C. Mogul, "The Case for Persistent–Connection HTTP, "*Proc. of ACM SIGCOMM'95* Conference on Application, Technologies, Architectures, and Protocols for Computer Communication, Aug. 28 to Sep. 1, 1995, Cambridge, Massachusetts.

Hot Java Applet Programming Contest–Winners, third prize "Terminal Emulator", <http://www.javasoft.com/contest/winners.html and <http://www.javasoft.com/contest/authors.html.

TN3270 Java Terminal Emulator and Libraries, <http://www.unige.ch/hotjava/HotSIBIL.html and <http://www.unige.ch/hotjava/TN3270.html.

Curt Lang and Jeff Chow, Database Publishing on the Web & Intranets (The Coriolis Group, Inc. 1996); i–ii (title pages), vii–xiii (table of contents), 20–21, 40–45, 293, 334, 400, 425–427, 443, 474 and 499–510 (index).

\* cited by examiner

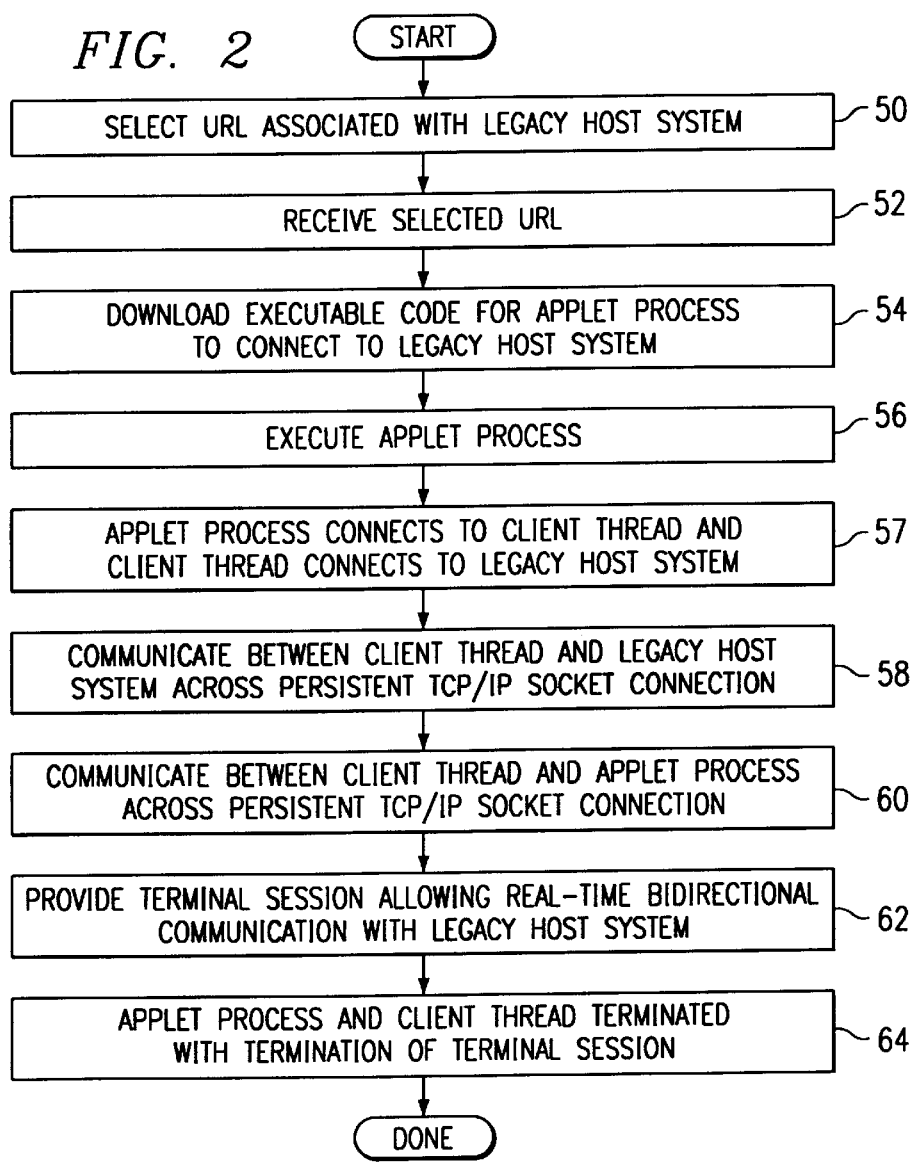
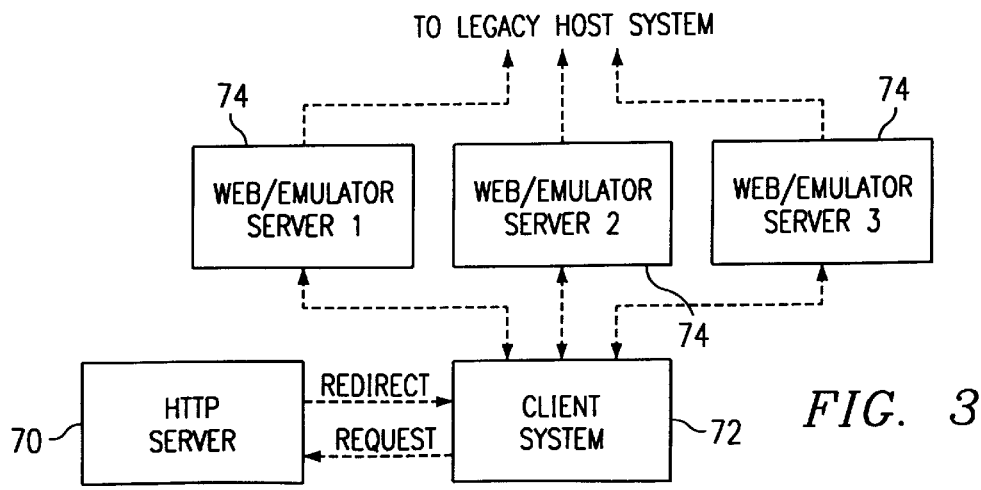

SERVER AND TERMINAL EMULATOR FOR PERSISTENT CONNECTION TO A LEGACY HOST SYSTEM WITH RESPONSE TIME MONITORING

RELATED APPLICATIONS

This application is a continuation-in-part application of application Ser. No. 09/069,522 filed Apr. 29, 1998, entitled, *Server and Web Browser Terminal Emulator for Persistent Connection to a Legacy Host System and Method of Operation*, which is a continuation application of application Ser. No. 08/625,109, filed Apr. 1, 1996 by Thomas H. Butts, et al. entitled, *Server and Web Browser Terminal Emulator for Persistent Connection to a Legacy Host System and Method of Operation*, now issued as U.S. Pat. No. 5,754,830.

TECHNICAL FIELD OF THE INVENTION

This invention relates in general to the field of electronic systems, and more particularly to a server and a web browser terminal emulator for persistent connection to a legacy host system and a method of operation.

BACKGROUND OF THE INVENTION

Many organizations operate computer network environments that include legacy host systems which store data and provide applications important to the operation of the organization. Such legacy host systems can include IBM mainframes (MVS, VM and VSE environments), IBM AS/400 systems and UNIX host systems.

It is desirable for such organizations to provide connection to the legacy host systems through terminal sessions on distributed client systems such as personal computers and computer workstations. This connection to the legacy host system provides access for users of the client systems to the data and applications on the legacy host system. These terminal sessions can include 3270, 5250, NVT and VT220 type terminal sessions.

One conventional method for providing terminal sessions is to execute a terminal emulator application on the client systems that connects directly to a host legacy system using a TCP/IP socket connection. Another conventional method is to provide connection through a web browser application by translating standard legacy data flows into HTML pages. However, such conventional web browser methods suffer from an inability to handle real-time host updates to user screens as well as other significant problems. For example, forms-based HTML/TN3270 packages are unable to overcome a range of problems associated with common HTML implementations such as real-time host updates to user screens or finding a user's browser platform address on the network.

SUMMARY OF THE INVENTION

One aspect of the invention is a computer-implemented terminal session emulator for providing browser-based access to legacy host applications. An emulation server, is in communication with a web server, by being built into an existing web server or otherwise. The emulation server negotiates a persistent connection between a legacy host system and a client system. Applet code is operable to create an applet process executing under a web browser on a client system. This applet code is downloadable from the web server to the client system in response to receiving a uniform resource locator associated with the legacy host system. When executed by the client system, the applet process communicates with the emulation server to provide a terminal session to a user of the client system via the persistent connection. The emulation server is further operable to handle protocol conversions of response time signals in data streams communicated between the applet process and the host system. In one embodiment, theses response time signals are derived from TELNET timing mark signals.

BRIEF DESCRIPTION OF THE DRAWINGS

FIG. 2 is a flow chart of a method for connecting a client system to a legacy host system using a web/emulator server according to the teachings of the present invention; and FIG. 3 is a block diagram of load-balancing across multiple web/emulator servers according to the teachings of the present invention.

DETAILED DESCRIPTION OF THE INVENTION

Figure 1:
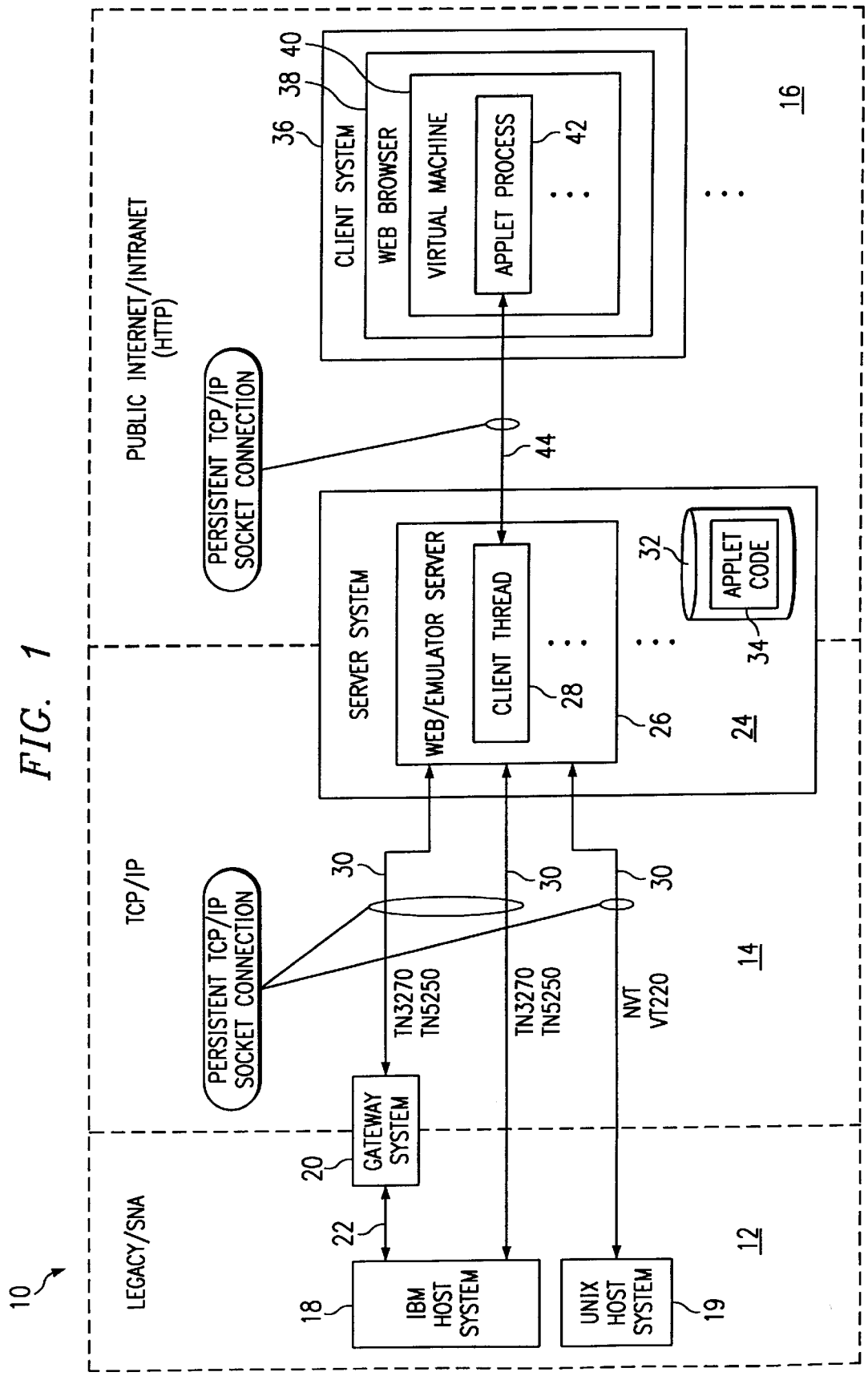
FIG. 1 is a block diagram of a computer network environment that allows connection of a client system to a legacy host system using a web/emulator server according to the teachings of the present invention.

FIG. 1 is a block diagram of a computer network environment, indicated generally at 10. Network environment 10 includes a legacy/SNA environment 12, a TCP/IP environment 14 and a public Internet/intranet environment 16.

Legacy/SNA environment 12 includes one or more legacy host systems such as an IBM host system 18 and a UNIX host system 19. IBM host system 18 can comprise an IBM mainframe (MVS, VM and VSE environment) or an IBM AS/400 system. UNIX host system 19 can comprise a computer workstation or server running a UNIX-type environment.

A gateway system 20 can be coupled to IBM host system 18 via a connection 22. Connection 22 can comprise an SNA or channel attachment to IBM host system 18. Gateway system 20 provides an interface between legacy/SNA environment 12 and TCP/IP environment 14. Gateway system 20 can be integral with IBM host system 18 or can be a separate, add-on system extending the functionality of IBM host system 18. For example, gateway system 20 can comprise an OC SERVER II™ gateway product available from OPENCONNECT SYSTEMS. UNIX host systems 19 and some IBM host systems 18 have built in TCP/IP connectivity such that the use of a gateway system 20 is unnecessary.

TCP/IP environment 14 includes a server system 24. Server system 24 executes one or more web/emulator servers 26. Web/emulation server 26 provides an interface between TCP/IP environment 14 and public Internet/intranet environment 16 and is operable to execute one or more client threads 28. Web/emulator server 26 is operable to connect to gateway system 20, to IBM host system 18 and to UNIX host system 19 via a persistent TCP/IP socket connection 30. Server system 24 includes a data storage device 32 that stores applet code 34. Applet code 34 comprises executable code for an applet process. Web/emulation server 26 can comprise an OC://WEBCONNECT™ server available from OPENCONNECT SYSTEMS, and applet code 34 can comprise a JAVA applet for use within SUN MICROSYSTEM's JAVA environment.

Public Internet/intranet environment 16 includes one or more client systems 36. Client system 36 can comprise a desk top computer such as a personal computer or computer workstation. Client system 36 is operable to execute a web browser 38. Web browser 38 is operable to establish a virtual machine 40 for executing an applet process 42. Applet process 42 comprises an instance of applet code 34 downloaded to client system 36 by web/emulator server 26. Applet process 42 is connected to client thread 28 via a persistent TCP/IP socket connection 44. Web browser 38 can comprise a commercially available web browser application such as NETSCAPE NAVIGATOR that is JAVA-capable and applet process 42 can comprise a JAVA applet.

In operation, web/emulator server 26, client thread 28 and applet process 42 form a web browser terminal emulator providing a persistent bidirectional connection between client system 36 and a legacy host system such as IBM host system 18 or UNIX host system 19. Applet process 42 communicates with client thread 28 across persistent TCP/IP socket connection 44. Client thread 28 communicates with an appropriate legacy host system, either IBM host system 18 or UNIX host system 19, across a persistent TCP/IP socket connection 30. Client thread 28 and applet process 42 allow a user of client system 36 to use web browser 38 to invoke a terminal session for accessing data and applications on a legacy host system. Each web/emulation server 26 is operable to manage a plurality of client threads 28 associated with a plurality of applet processes 42. In one embodiment of the present invention, each web/emulation server 26 is operable to manage a thousand such connections.

Client thread 28 executes under web/emulator server 26 and is operable to communicate with a legacy host system across a persistent TCP/IP socket connection 30. Client thread 28 is operable to interface between TCP/IP environment 14 and public Internet/intranet environment 16. Applet process 42 executes under web browser 38 and is operable to communicate with client thread 28 across persistent TCP/IP socket connection 44. In one embodiment of the present invention, client thread 28 and applet process 42 using a web/emulator data flow. Applet process 42 is further operable to provide a terminal session to a user of the client system 36. The terminal session can comprise a 3270, 5250, NVT or VT220 type terminal session. This terminal session provided by applet process 42 and client thread 28 is supported by a persistent TCP/IP socket connection which allows real-time bidirectional communication with the legacy host system.

In one embodiment of the present invention, the applet process uses three threads to implement the terminal session. The applet process uses a READ thread, a WRITE thread and an EMULATION thread. The READ thread provides a buffer interface to persistent TCP/IP socket connection 44 and reads information from the socket. The WRITE thread provides a buffer interface to persistent TCP/IP socket connection 44 and writes to the socket. The EMULATION thread provides the user interface representing the terminal session on the legacy host system. In this embodiment, the applet process and the client thread communicate using a web/emulator data flow based upon the communication protocol that is set forth in APPENDIX A.

According to the present invention, a user of client system 36 can access data and applications on the legacy host system using web browser 38 where the access is provided through a persistent bidirectional connection to the legacy host system. Persistent TCP/IP socket connections 30 and 44 provide this persistent bidirectional connection to IBM host system 18 or UNIX host system 19 such that real-time host updates, security, encryption, help-desk support, and other real-time features are supported. One embodiment of the present invention uses SUN MICROSYSTEMS' JAVA technology and includes JAVA-capable web browsers 38 and embedded JAVA applet processes 42 to provide terminal session connectivity to client systems 36.

The present invention provides connectivity to legacy host systems such as IBM host system 18 and UNIX host system 19 through web browser 38 without the need for specialized emulation software to be manually loaded on each client system 36 and without the need for user programming. Web/emulator server 26 downloads applet code 34 to client system 36 when the uniform resource locator (URL) of the legacy host system is selected by the user. This is accomplished automatically without requiring service personnel to load software on client system 36.

The present invention also allows the expansion of access to existing data and applications on legacy host systems from existing client systems 36 using existing network capabilities. The present invention provides a network environment 10 that allows the use of a public Internet/intranet environment 16 having web browser tools, such as JAVA tools, and web-serving to incorporate Internet-type technologies, through the Internet or an intranet, with existing network architectures. Thus, an organization can implement web browser 38 based access to legacy host systems, such as IBM host systems 18 and UNIX host systems 19, without scrapping or significantly restructuring existing network resources.

FIG. 2 is a flow chart of a method for connecting a client system to a legacy host system using a web/emulator server according to the teachings of the present invention.

In step 50, a uniform resource locator (URL) associated with a legacy host system is selected from a web browser executing on a client system. The web browser can comprise a JAVA-capable NETSCAPE NAVIGATOR web browser as mentioned above. The selected uniform resource locator is received by a web/emulator server in step 52. In step 54, the web/emulator server downloads executable code for an applet process to the client system for connecting to the legacy host system. In step 56, the client system executes the applet process under the web browser. The applet process can comprise a JAVA applet for execution within a JAVA virtual machine within the NETSCAPE NAVIGATOR web browser.

In step 57, the applet process connects to a client thread executed by the web/emulator server, and the client thread connects to the legacy host system across persistent TCP/IP socket connections. In step 58, the client thread then communicates with the legacy host system across the persistent TCP/IP socket connection. This communication allows the client thread to establish and maintain a terminal connection to the legacy host system. In step 60, the client thread communicates with the applet process across a persistent TCP/IP socket connection. This communication can be accomplished using a web/emulator data flow such as that based upon the communication protocol set forth in APPENDIX A.

In step 62, the applet process provides a terminal session to a user of the client system. According to the present invention, this terminal session allows real-time bidirectional communication with the legacy host system across a persistent TCP/IP socket connection to the legacy host system. This terminal session, as mentioned above, can comprise a 3270, 5250, NVT or VT220 type terminal session.

The terminal session can be terminated by the user of the client system as desired. The applet process and client thread are terminated, in step 64, when the terminal session is terminated. In one embodiment, after termination, the applet process is removed from execution memory and is no longer present on the client system. In another embodiment, the executable code for the applet can be stored on a data storage device associated with the client system. In this embodiment, the web/emulation server can check the client system to determine whether new executable code for the applet needs to be downloaded based upon the version present, if any, on the data storage device of the client system.

The present invention provides an interface to legacy data flows, such as telnet (TN) data flows, across persistent TCP/IP socket connections to give users persistent bidirectional access to legacy host system data in terminal sessions, such as 3270, 5250, NVT and VT220 type terminal sessions. According to the present invention, terminal emulation is partially provided by applet executable code downloaded from the web/emulation server. The user can select the uniform resource locator (URL) of the legacy host system via a web browser package, such as NETSCAPE's NETSCAPE NAVIGATOR, and transparently receive the applet code which is executed and invokes an appropriate terminal session.

The present invention provides users of the client system access to real-time legacy host system data and applications using a web browser. The web/emulator server system converts standard legacy data flows into web/emulator data flows and vice versa permitting multi-session, multi-protocol access to legacy data and applications. The applet process converts the web/emulator data flows into a terminal session for display to the user. As mentioned above, the web browser can comprise a JAVA-capable web browser, the applet process can be a JAVA applet, and the web/emulator data flow can be based upon the protocol set forth in Appendix A. This embodiment of the present invention can blend web browsers enhanced by SUN MICROSYSTEMS' JAVA with legacy host systems having TCP/IP connectivity to allow users on any client system platform to connect to and access legacy host systems via 3270, 5250, NVT and VT220 type terminal emulation.

FIG. 3 is a block diagram of load-balancing across multiple web/emulator servers according to the teachings of the present invention. An HTTP server 70 is coupled to a client system 72. HTTP server 70 receives request information, REQUEST, from client system 72 in the form of a uniform resource locator (URL) and provides redirection information, REDIRECT, to client system 72. Client system 72 is then coupled to one of a plurality of web/emulation servers 74 according to the redirection information. In this manner HTTP server 70 can redirect access by a plurality of client systems 72 to manage the load on web/emulation servers 74 to ensure a balance across all available web/emulation servers 74.

This load-balancing can remain transparent to a user of client system 72. The user enters the uniform resource locator associated with the legacy host system. That information is transmitted to HTTP server 70 as a request. HTTP server 70 interprets the request, identifies the selected legacy host system, and selects a web/emulation server 74 to manage the connection. This selection of a web/emulation server 74 can be based upon information of the current loading of each web/emulation server 74. HTTP server 70 transparently provides redirect information to client system 72 which identifies the uniform resource locator of the selected web/emulation server 74. Client system 72 then initiates the above described terminal session through the selected web/emulation server 74 and the selected web/emulation server 74 connects to the legacy host system as described above.

The present invention provides web browser connectivity with relatively low initial and recurring cost. The need for individual emulation software products based upon each particular client system is removed. This eliminates many technical support, help desk and software distribution problems, including version level control and configuration management issues. Extensive user training is no longer necessary because web browsers generally offer intuitive common user interfaces and are known by many users. Implementation time is improved by taking advantage of an existing widely-installed web browser base. Specifically, the platform independence provided by the JAVA architecture allows the web browser terminal emulator of the present invention to avoid problems with operation differences between computer environments. In addition, numerous users can be supported concurrently by each web/emulation server. For example, the OC://WEBCONNECT™ product from OPENCONNECT SYSTEMS can support a thousand users per instance.

The present invention provides connectivity from any client system, such as a personal computer or computer workstation, to a legacy host system, such as a mainframe or mid-range system, without costly redesign or rebuilding of legacy applications. The benefits of a distributed client/server type data exchange can be realized without requiring systems redesign. This approach means that the many advantages of Internet-type access and functionality can be blended into an organization's network architecture simply and efficiently, thus protecting existing information technology infrastructures and investments.

Response Time Monitoring

Network management permits a network manager at a station connected to the network to collect data about the devices on the network. One popular network management platform is the NETVIEW platform, a product of the IBM Corporation especially designed for use with OS/390 host systems. NETVIEW provides various network management functions, such as monitoring network hardware to detect problems, performance monitoring of network traffic, restoring failed nodes, and the like.

A feature of the invention is its support of response time monitoring provided by a host-based network management tool, such as NETVIEW. It is assumed that NETVIEW software (or equivalent software) is installed on host system 10. Although this description is in terms of NETVIEW OS/390, the same concepts may be applied to equivalent response time monitoring software for any type of host system 10.

It is also assumed that gateway 20 (often referred to as a TN server) supports a response time monitoring function, such as that provided by NETVIEW. NETVIEW also provides a means to keep up with response time "buckets" for logical units.

Thus, gateway 20 permits a user at host system 18 to query for response times of TCP/IP clients. An example of a suitable gateway 20 is the WEBCONNECT SNA ACCESS server, available from OpenConnect Systems Incorporated. This product uses the TELNET timing mark option (part of the TELNET protocol) to obtain response time data from TCP/IP client nodes. As explained below, the invention extends response time monitoring to internet as well as intranet clients.

Referring again to FIG. 1, as explained above, the invention is used within a "browser-based SNA-capable" communications network, where a server 26 downloads an applet process 42 to a client system 36 in response to a UR. call from client system 36 to host system 10. Host system 10 (with or without the aid of a separate gateway) provides a SNA-type data flow. The applet process 42 generates the terminal emulation session at client system 36. Various embodiments of the invention use different SNA data to provide different terminal sessions, such as 3270, 5250, NVT, or VT220 terminal sessions.

The connection between host system 18 and client system 36 is a persistent connection. Various embodiments of the invention negotiate and maintain the persistent connection using different configurations. For example, the network may or may not include a TN server (gateway 20) or a built-in TN interface at host system 18. Also, although FIG. 1 illustrates server 26 as having both web server and emulation server functions implemented on the same computer, they may be implemented on separate computers. Furthermore, the emulation server functions may be implemented on host system 18, with or without a separate web server. Regardless of the specific configuration, common characteristics of the invention are the downloading of an applet process 42 to the client system and the negotiation of a persistent connection between legacy system 18 and client system 36.

The terminal session data flow is established in accordance with a protocol associated with the applet process 42, that is, a protocol that permits applet process 42 to communicate with host system 18. This communication may be via a emulation programming at server 26, which performs tasks such as encryption. In the example of this description, applet process 42 is a Java applet and the protocol is consistent with the Java language. However, the invention may be implemented with applets in other languages, with a common characteristic being that the applet is downloaded to provide client-executable code and has an associated protocol that permits it to communicate with server 26.

For response time monitoring, server 26 may be configured to provide response times from server 26 or from internet clients, such as client system 36. As stated above, the timing data is derived from TELENET timing marks. A DO TIMING-MARK requests that the receiver of this command return a WILL TIMING-MARK. The sender of the WILL TIMING-MARK assures the receiver of this command that it is inserted in the data stream at the appropriate place with respect to the DO TIMING-MARK. The time between the DO TIMING-MARK and the WILL TIMING-MARK can be used to calculate response time.

In operation, gateway 20 receives response time monitoring requests from a NETVIEW application associated with host system 10. Gateway 20 provides the DO TIMING-MARK to server 26, which contains appropriate programming for handling response time monitoring commands. In the case where server 26 is configured for only the response time between itself and the host system 10, the timing mark is delivered back to gateway 20 without being passed to client system 36. In response to a response time monitoring request that extends to client 36, server 26 is programmed to perform conversions between the request/response protocols and the applet protocol 42.

As an example of request time monitoring to a client system 36, for a given data transmission, host system 18 might issue a request via gateway 20 to server 26. This request would trigger a timing mark from gateway 20 in the form of four timing mark bytes attached to the transmission. At server 26, the response time monitoring request is converted to the protocol associated with applet process 42 so that the response time to the client system 36 can be known. Meanwhile, gateway 20 monitors the time until the client system 36 answers back with data or other response, with the response timing mark attached. Consistent with NETVIEW, the timing data might be in the form of "bucket" counts. Regardless of the specific host-based response time management tool, the invention permits true end-to-end response times to be determined.

020758.02C                                          PATENT APPLICATION

17

*Emulation Protocol*

~~APPENDIX A~~

The following provides one implementation of a communication protocol for web/emulation data flow between a client thread and an applet process. (For all values with a length, length = 0 indicates the field is not present. All fields are byte values.)

---
Java Client Protocol (JCP) - Client To Server        Issue:  1.7/1.8
---

Command Description

S   Connect Session

G   Start Configuration Session

V   Protocol Version

F   Field Update

N   NVT Keystroke

R   Run Script

H   Query Help Desk

K   Process Emulation Keystroke

X   Send Public Key i   Ping p   Print Data y   Are You There?

E   Error Reporting

---

S (83 dec - 53 hex) - Connect Session

A connect session is sent to the server to start a connection. A connect session request has the following format:

| Offset | Length | Value | Description |
|---|---|---|---|
| 0 | 1 | S | Command |
| 1 | 1 | type | Emulation Type |
| 2 | 1 | type | Client Type |
| 3 | 1 | host length | Host Name Length |
| 4 | host length | host name | ASCII Host Name |
| 4 + host length | 1 | LU length | LU Name Length |
| 5 + host length | LU length | LU name | ASCII LU Name |
| 5 + host length + LU length | 1 | TCP length | TCP Port Length |
| 6 + host length + LU length | TCP length | TCP Port | ASCII TCP Port |
| 6 + host length + LU length + TCP length | 1 | session length | Session Name Length |
| 7 + host length + LU length + TCP length | session length | session name | ASCII Session Name |

The Emulation Type are defined as follows:

01 = 3270
02 = 5250
03 = 3287
04 = VT220

The Client Type are defined as follows:

01 = WebConnect Interactive Client
02 = OpenVista Client

Ultralite Java client that is using 1.4 or earlier, the first command that is sent to the server is the start session command. For version 1.7 and later, Ultralite client send a version command to the server first then the start session command.

G (71 dec - 47 hex) - Start Configuration Session - Same as 'S" with Encryption

A start configuration session is sent to the server to start a configuration connection. A start configuration request has the following format:

Offset Length  Value Description 0     1      G     Command

V (86 dec - 56 hex) - Protocol Version

A protocol version request is sent to the client to see if the client is compatiable with the server. A protocol version request has the following format:

Offset Length  Value Description 0     1      V     Command 1     1      major Major Version 2     1      minor Minor Version Version Number:
Major Minor Description 1   4   Ultra Lite 1   5   Enhanced/Power User 1   6   Enhanced/Power User - Using Token Authication

| | | |
|---|---|---|
| 1 | 7 | Ultra Lite - Added Character Set to Character Override Attribute List |
| 1 | 8 | Enhanced/Power User - Added Character Set to Character Override Attribute List |

F (70 dec - 46 hex) - Field Update

A field update request is sent to the server to update a field. A field update request has the following format:

| Offset | Length | Value | Description |
|---|---|---|---|
| 0 | 1 | F | Command |
| 1 | 1 | reason | Reason for Field Update |
| 2 | 1 | value | AID Value from Client |
| 3 | 1 | correlator | Correlator from Query Field Update Command |
| 4 | 1 | value | Only One Field at a Time |
| 5 | 2 | position | Cursor Position |
| 7 | 2 | count | Field Count |

For each field, the following data is repeated.

| Offset | Length | Value | Description |
|---|---|---|---|
| 0 | 2 | position | Field Position |
| 2 | 2 | field length | Field Length |
| 4 | 1 | type | Field Data Type |
| 5 | field length | data | Field Data |

The Reason for Field Update are defined as follows:

01 = Unsolictied
02 = Reply to Query Field Update Command

03 = Reset MDT for the field

The Data Type are defined as follows:

01 = UNICODE
02 = ASCII

N (78 dec - 4E hex) - NVT Keystroke

A NVT keystroke request is sent to the server to process the NVT key.
A NVT keystroke request has the following format:

Offset Length  Value Description 0    1    N    Command 1    1    value ASCII Character R (82 dec - 52 hex) - Run Script A run script request is sent to the server to run a TCL script file. A
run script request has the following format:

Offset    Length       Value    Description 0         1            R        Command 1         1            filename length Script File Name Length 2         filename length   filename   Script File Name H (72 dec - 48 hex) - Query Help Desk A query help desk request is sent to the server to query a help desk.
A query help desk request has the following format:

Offset Length  Value Description 0    1    H    Command

K (75 dec - 4B hex) - Process Emulation Keystroke

A process emulation keystroke request is sent to the server to process
a keystoke. A process emulation keystroke request has the following format:

Offset Length Value Description

| Offset | Length | Value | Description |
|---|---|---|---|
| 0 | 1 | K | Command |
| 1 | 2 | value | Key Value |
| 3 | 1 | flag | Translation Flag |

The Translation Flag are defined as follows:

0 = Do not translate key value.
1 = Translator key value from ASCII to EBCDIC
3 = Key value is UNICODE X (88 dec - 58 hex) - Send Public Key Send Public Key sends the client's Diffie-Hellman public key to the server after receiving Diffie-Hellman parameters from the server's previous start secure session command. Diffie-Hellman keys are used to compute a shared secret for the RC4 encryption key (outbound only). The client send public key message has the following format:

| Offset | Length | Value | Description | Offset | Length | Value | Description |
|---|---|---|---|---|---|---|---|
| 0 | 1 | X | Command | 0 | 1 | X | Command |
| 1 | modSize from server start secure session request | key | Client DH Public Key | 1 | 1 | size | Client Session Key Size |
| | | | | 2 | modSize from server start secure session request | key | Client DH Public Key |
| | JCP 1.7 (ultra-lite) | | | | JCP 1.8 (enhanced/power) | | | i (105 dec - 69 hex) - Ping

A ping is sent to the server every 35 minutes to keep the applet alive. A ping has the following format:

Offset Length  Value  Description 0      1       i      Command p (112 dec - 70 hex) - Print Data A print data request is sent to the server in response to the print data command. A print data request has the following format:

Offset Length  Value  Description 0      1       p       Command 1      1       command Print Subcommands The Print Subcommands are defined as follows:

R = Request Response - Return 2 byte Sequence Number (HI|LO)

y (121 dec - 79 hex) - Are You There?

A are you there request is sent to the server to see if WebConnect is still running. A are you there request has the following format:

Offset Length  Value  Description 0      1       y       Command 1      1       minutes Number of minutes for for client to send AYT command to server.

E (69 dec - 45 hex) - Error Reporting

A error reporting request is sent to the server to report an error. A error reporting request has the following format:

Offset Length  Value  Description 0      1       E        Command 1      2       position Cursor Position 020758.020                                    'ATENT APPLICATION

24

3    2    code    Error Code

----------------------------------------------------------------------
        Java Client Protocol (JCP) - Server To Client    Issue:   1.7/1.8
        ----------------------------------------------------------------------

Command Description

E    Erase Display

R    Erase Region

L    Scroll Region

S    Set Display Size

C    Set Cursor Position

D    Display Text

O    OIA Text

F    Field List

A    Character Override Attribute List

Q    Query Field Update

G    Configuration

Keyboard

Color

Attribute

Hotsport

AutoGUI

N    Set NVT Mode

K    Keyboard Lock State 020758.020                                              PATENT APPLICATION

25

B   Sound Alarm b   Begin Session

M   Error Message h   Hide Emulation Display

V   Protocol Version

H   Help Desk Reply

W   Update Complete

P   Operation Mode

3270 Parameters

5250 Parameters

3287 Parameters

RUI Parameters

TN Parameters

Network Parameters

3270 Field Attribute

3270 Extended Field Attribute

X   Start Secure Session

Y   Server Key p   Print Data

T   WebConnect Protocol Message q   Allow User Configuration State y   I Am Here. (Are You There Response)

AUS01:150839.1
020758.0209

020758.02C                                          PATENT APPLICATION

26 z    Data Compression Enabled i    Ping Echo (Pong)

---

E (69 dec - 45 hex) - Erase Display

A erase display request is sent to the client to erase the display. A erase display request has the following format:

Offset Length  Value Description 0    1    E    Command

R (82 dec - 52 hex) - Erase Region

A erase region request is sent to the client to erase a region on the display. A erase region request has the following format:

Offset Length  Value Description 0    1    R    Command 1    2    start  Start Offset 3    2    end   End Offset L (76 dec - 4C hex) - Scroll Region A scroll region request is sent to the client to scroll a region on the display. A scroll region request has the following format:

Offset Length    Value      Description 0    1      L      Command 1    2      start  Start Offset 3    2      end    End Offset 5    1      direction of scroll 1 Scroll Up
                                   2 Scroll Down
                                   3 Scroll Left
                                   4 Scroll Right

AUS01:150839.1
020758.0209

020758.02(                                               PATENT APPLICATION

27

6    1      count    Number of times to scroll

S (83 dec - 43 hex) - Set Display Size

A set display size request is sent to the client to set the display
   size. A set display size request has the following format:

Offset Length  Value  Description 0    1      S      Command 1    1      rows   Number of Rows 2    1      column Number of Columns C (67 dec - 43 hex) - Set Cursor Position A set cursor position request is sent to the client to set the cursor
   position. A set cursor position request has the following format:

Offset Length  Value  Description 0    1      C      Command 1    2      position Cursor Position D (68 dec - 44 hex) - Display Text A display text request is sent to the client to display the text on
   the screen. A display text request has the following format:

Offset   Length   Value   Description 0    1       D      Command 1    2       position  Text Position 3    2       text length  Text Length 5    1 - 4   type    Text Type & Attributes ?    text length  data  Text The Text Type are defined as follows:

AUS01:150839.1
020758.0209

Bit 7 - Additional header follows for extended attribute list
Bit 6 - Text is protected field
Bit 5 - Text is intensified field
Bit 4-2 - unused
Bit 1,0 - Character encoding:
   00 = Bytes (used for raw mode printing)
   01 = UNICODE
   02 = ASCII Optional second byte for extended attribute data (if bit 7 set in first byte):
Bit 7 - Additional header follows for printer attributes
Bit 4,3 - Extended Highlight:
   00 = Normal Video
   01 = Blinking Video
   10 = Reverse Video
   11 = Underline
Bit 2,1,0 - Extended Color:
   000 = Default Color
   001 = Blue
   010 = Red
   011 = Pink
   100 = Green
   101 = Turquoise
   110 = Yellow
   111 = White (Black for Printer)

Optional third byte for printer attribute data (if bit 7 set in second byte):
Bit 7 - Additional header follows
Bit 6 - Subscript
Bit 5 - Superscript
Bit 4 - Italics
Bit 3 - Double wide
Bit 2 - Double strike Optional fourth byte for additional attribute data (if bit 7 set in third byte):
Bit 0 - DBCS data (currently used for 3287 only)

O (79 dec - 4F hex) - OIA Text

A OIA text request is sent to the client to display the OIA text on the screen. A OIA text request has the following format:

020758.020  PATENT APPLICATION

| Offset | Length | Value | Description |
|---|---|---|---|
| 0 | 1 | O | Command |
| 1 | 1 | Column | Column |
| 2 | 1 | OIA length | Length of OIA Text |
| 3 | OIA length | data | OIA Text |

F (70 dec - 46 hex) - Field List

A field list request is sent to the client to set up the field list. A field list request has the following format:

| Offset | Length | Value | Description |
|---|---|---|---|
| 0 | 1 | F | Command |
| 1 | 2 | Count | Field Count |

For each field, the following data is repeated.

| Offset | Length | Value | Description |
|---|---|---|---|
| 0 | 2 | Start | Start Position |
| 2 | 1 | Value | Field Attribute |
| 3 | 1 | Value | Extended Field Attribute |
| 4 | 1 | Value | Additional Field Attribute |
| 5 | 2 | Length | Field Length |

A (65 dec - 41 hex) - Character Override Attribute List

A character override attribute list request is sent to the client to set the attribute list. A character override attribute list request has the following format:

| Offset | Length | Value | Description |
|---|---|---|---|
| 0 | 1 | A | Command |

| | | | |
|---|---|---|---|
| 1 | 2 | Count | Attribute Count |

For each attribute, the following data is repeated.

| Offset | Length | Value | Description |
|---|---|---|---|
| 0 | 2 | Start | Start Position |
| 2 | 2 | Length | Length of Attributes |
| 4 | 1 | Value | Extended Field Attribute |
| 5 | 1 | Value | Character Set |

The Character Set are defined as follows:
 1 VT_CS_ASCII

2 VT_CS_DEC_SPECIAL_GRAPHIC

3 VT_CS_DEC_SUPPLEMENTAL

4 VT_CS_NRC_BRITISH

5 VT_CS_NRC_DUTCH

6 VT_CS_NRC_FINNISH

7 VT_CS_NRC_FRENCH

8 VT_CS_NRC_FRENCH_CANDIAN

9 VT_CS_NRC_GERMAN

10 VT_CS_NRC_ITALIAN

11 VT_CS_NRC_NORWEGIAN_DANISH

12 VT_CS_NRC_SPANISH

13 VT_CS_NRC_SWEDISH

14 VT_CS_NRC_SWISS

Q (81 dec - 51 hex) - Query Field Update 020758.020                                    ATENT APPLICATION

31

A query field update request is sent to the client for a field update.
A query field update request has the following format:

Offset Length Value Description 0    1    Q    Command 1    1         Correlator Returned in Field Update Message from
                Client G (71 dec - 47 hex) - Configuration A configuration request is sent to the client for configuration. A
configuration request has the following format:

Offset Length Value Description 0    1    G    Command

Subcommand

The Subcommands are defined as follows:

K (75 dec - 4A hex) - Keyboard:
Offset Length Value Description 1    1    K    Subcommand 2    1    count Multikey Count For each multikey, the following data is repeated.

Offset Length Value Description 0    2    value Map Value 2    1    count Sequence Count For each map value, the following data is repeated.

Offset Length Value Description 0    1    modifier Key Modifier 020758.020                                              PATENT APPLICATION

32

1    2    value   Key Value

C (67 dec - 43 hex) - Color:
        Offset Length  Value  Description 1    1    C    Subcommand 2    1    color Color 3    1    red  Red 4    1    green Green 5    1    blue Blue A (65 dec - 41 hex) - Attribute:
        Offset Length  Value   Description 1    1    A    Subcommand 2    1    type   Attribute Type 3    1    mask   Attribute Mask 4    1    value  Attribute Value 5    1    apperance Visual Apperance 6    1    color  Foreground Color 7    1    color  Background Color The Attribute Type are defined as follows:

00 = Field Attribute
            01 = Extended Field Attribute
        The Visual Apperance are defined as follows:

Bit 0: Field
            Bit 1: Button
            Bit 2: Transparent
            Bit 3: Intense
            Bit 4: Reverse
            Bit 5: Dotted Underline

AUS01:150839.1
020758.0209

Bit 6: Underline
Bit 7: Blink

H (72 dec - 48 hex) - Hotspot:

| Offset | Length | Value | Description |
|---|---|---|---|
| 1 | 1 | H | Subcommand |
| 2 | 2 | value | Key Value |
| 4 | 2 | key length | Key Length |
| 6 | key length | text | ASCII Match Text |

G (71 dec - 47 hex) - AutoGUI:

| Offset | Length | Value | Description |
|---|---|---|---|
| 1 | 1 | G | Subcommand |
| 2 | 1 | field type length | Field Type Length |
| 3 | field type length | field type | ASCII Field Type |
| 3 + field type length | 1 | AWT length | AWT Object Length |
| 4 + field type length | AWT length | value | ASCII AWT Object |
| 4 + field type length + AWT length | 1 | foreground length | Foreground Color Length |
| 5 + field type length + AWT length | foreground length | foreground color | ASCII Foreground Color |
| 5 + field type length + AWT length + foreground length | 1 | background length | Background Color Length |

| | | | | |
|---|---|---|---|---|
| 6 + field type length + AWT length + foreground length | background length | background color | ASCII | Background Color |
| 6 + field type length + AWT length + foreground length + background length | 1 | font name length | | Font Name Length |
| 7 + field type length + AWT length + foreground length + background length | font name length | font name | ASCII | Font Name |
| 7 + field type length + AWT length + foreground length + background length + font name length | 1 | font size length | | Font Size Length |
| 8 + field type length + AWT length + foreground length + background length + font name length | font size length | font size | ASCII | Font Size |
| 8 + field type length + AWT length + foreground | 1 | font style length | | Font Style Length | length +
background
length +
font name length
+
font size length

9 + field type    font style    font style    ASCII Font Style
length +         length
AWT length +
foreground
length +
background
length +
font name length
+
font size length N (78 dec - 4E hex) - Set NVT Mode A set NVT mode request is sent to the client to set the NVT mode. A set NVT mode request has the following format:

Offset Length  Value Description 0    1    N    Command 1    1    Flags 00 = Emulation, 01 = NVT Mode K (75 dec - 4B hex) - Keyboard Lock State A keyboard lock state request is sent to the client to set the keyboard lock state. A keyboard lock state request has the following format:

Offset Length  Value Description 0    1    K    Command 1    1    Flag  00 = Keyboard Unlocked, 01 = Keyboard Locked B (66 dec - 42 hex) - Sound Alarm A sound alarm request is sent to the client to sound the alarm bell. A 020758.02C                                         ATENT APPLICATION

36 sound alarm request has the following format:

Offset Length Value Description 0   1   B   Command b (98 dec - 62 hex) - Begin Session A begin session request is sent to the client to begin the session. A begin session request has the following format:

Offset Length Value Description 0   1   b   Command

M (77 dec - 4D hex) - Error Message

A error message request is sent to the client to display a error message. A error message request has the following format:

Offset Length Value Description 0   1   M   Command 1   2   sessionID Session ID 3   1   message ASCII Error Message h (104 dec - 68 hex) - Hide Emulation Display A hide emulation display request is sent to the client to hide the display. A hide emulation display request has the following format:

Offset Length Value Description 0   1   h   Command 1   1   Flags 0x00 = Display Off, 0x01 = Display On V (86 dec - 56 hex) - Protocol Version A protocol version request is sent to the client to see if the client is compatiable with the server. A protocol version request has the following format:

020758.020                                              PATENT APPLICATION

37

Offset Length  Value Description 0      1       V     Command 1      1       major Major Version 2      1       minor Minor Version Version Number:
Major Minor Description 1    4   Ultra Lite 1    5   Enhanced/Power User 1    6   Enhanced/Power User - Using Token Authication 1    7   Ultra Lite - Added Character Set to Character Override
         Attribute List 1    8   Enhanced/Power User - Added Character Set to Character
         Override Attribute List H (72 dec - 48 hex) - Help Desk Reply A help desk reply request is sent to the client in response to the
help desk request. A help desk reply request has the following format:

Offset          Length       Value     Description 0               1            H         Command 1               1            version length Server Version Length 2               version      server version ASCII Server Version
                length                 String 2 + version     2            Session ID  Session ID
length 4 + version     1            Emulation Type 01 = 3270
length                                      02 = 5250
                                            03 = 3287

020758.020                                          PATENT APPLICATION
                                    38

5 + version    1    Protocol Type  01 = RUI
              length                             02 = TN 6 + version    1    Transport Type 01 = None (RUI)
              length                             02 = Network W (87 dec - 57 hex) - Update Complete A update complete request is sent to the client to update the display.
A update complete request has the following format:

Offset Length Value Description 0    1    W    Command

P (50 dec - 80 hex) - Operation Mode

A operation mode request is sent to the client to ???. A operation
mode request has the following format:

Offset Length  Value   Description 0    1    P    Command 0    1    Emulation Emulation Type 1    2    Reason   Reason The Emulation Type are defined as follows:

00 = 5250
    01 = ?

3270 Parameters
    Offset Length    Value       Description 0    1    display type   00 = 3278
                                 01 = 3279
                                 02 = 3179
                                 03 = 3472

1    1    status         00 = Unowned
                                 01 = SSCP
                                 02 = LULU 020758.02                                        PATENT APPLICATION

39

2    1    default partition  Default Model Size (2 - 5)

3    1    alternate partition Alternate Model Size (2 -
                                       5)

4    1    current partition  Current Model Size (2 - 5)

5250 Parameters
    Offset Length    Value    Description 0    1    display type 00 = 3477
                                01 = 3179
                                02 = 5151
                                03 = 3196

1    1    screen size  2 or 5

2    1    OC Server  0 = Other Type of Server
                              1 = OC Server 3    1    PTS Override 0 = No Override
                                1 = Pass Thru Scree Override 4    1    Monochrome 00 = Color
                              01 = Monochrome 3287 Parameters
    Offset Length    Value    Description 0    2    Print Job Count   Print Job Count 2    1    Last Printer Status Not defined yet RUI Parameters
         Offset     Length     Value     Description 0         1       request LU    Request LU Name
                              name length   Length 1         requested LU  requested LU  Requested LU
                      name length   name          Name Length 1 + requested     1     granted LU    Granted LU Name
         LU name length          name length   Length

| | | | | |
|---|---|---|---|---|
| 2 + requested LU name length | granted LU name length | granted LU name | Granted LU Name | |
| 2 + requested LU name length + granted LU name length | 1 | RUI version length | RUI Version Length | |
| 3 + requested LU name length + granted LU name length | RUI version | RUI version length | RUI Version | |
| 3 + requested LU name length + granted LU name length + RUI version length | 2 | RUI sessionID | RUI Session ID | |

TN Parameters

| Offset | Length | Value | Description |
|---|---|---|---|
| 0 | 1 | terminal type | Terminal Type String (Negotiated with TN server) |
| 1 | 1 | TN 3270E | 0 = Not 3270E, 1 = 3270E |
| 2 | 1 | device name length | Device Name Length |
| 3 | device name length | device name | ASCII Device Name |
| 3 + device name length | 1 | PU/LU name length | PU/LU Name Length |
| 4 + device name length | PU/LU name length | PU/LU name | ASCII PU/LU Name |

020758.02( PATENT APPLICATION

41

Network Parameters

| Offset | Length | Value | Description |
|---|---|---|---|
| 0 | 1 | requested host name length | Requested Host Name Length |
| 1 | requested host name length | requested host name | Requested Host Name |
| 1 + requested host name length | 1 | requested port number length | Requested Port Number Length |
| 2 + requested host name length | requested port number length | requested port number | Requested Port Number (ASCII) |
| 2 + requested host name length + requested port number length | 1 | actual host name length | Actual Host Name or IP Address Length |
| 3 + requested host name length + requested port number length | actual host name length | actual host name | Actual Host Name or IP Address (ASCII) |
| 3 + requested host name length + requested port number length + actual host name length | 1 | actual port number length | Actual Port Number Length |
| 4 + requested host name length + requested port | actual port number length | actual port number | Actual Port Number (ASCII) |

020758.020                                          PATENT APPLICATION

42 number length + actual host
         name length

3270 Field Attribute
           Bit      Value      Description
           Offset 0       field state    0 = Field Unchanged
                                   1 = Field Modified 1       reserved       Reserved 2 & 3   display        00 = Display/Non-Detectable
                                   01 = Display/Detectable
                                   10 = Intensified
                                   Display/Detectable
                                   11 = Non-Display/Non-Detectable 4       alpha/numeric  0 = Alphanumeric
                                   1 = Numeric 5       unproteced/protected  0 = Unprotected
                                          1 = Proteced 6 & 7   reserved       Reserved 3270 Extended Field Attribute
         Bit Offset   Value   Description 0, 1 & 2  color   000 = Black
                              001 = Blue
                              010 = Red
                              011 = Pink
                              100 = Green
                              101 = Turquoise
                              110 = Yellow
                              111 = White 3 & 4     video   00 = Normal Video
                              01 = Blinking Video
                              10 = Reverse Video
                              11 = Underline Video

AUS01:150839.1
020758.0209

020758.02(                                              PATENT APPLICATION

43

6    reserved  Reserved 7    field  0 = Not the first position of a field
                    1 = Field Mark (Start of field position)

X (88 dec - 58 hex) - Start Secure Session

A start secure session request is sent to the client to start a
Diffie-Hellman/RC4-encrypted session. A start secure session request
has the following format:

| Offset | Length | Value | Description | Offset | Length | Value | Description |
|---|---|---|---|---|---|---|---|
| 0 | 1 | X | Command | 0 | 1 | X | Command |
| 1 | 1 | modLen | Server Prime modulus Length | 1 | 1 | keyLen | Session Key Length |
| 2 | modLen | prime | Prime | 2 | 1 | modLen | Server Prime modulus Length |
| ? | modLen | generator | Generator | 3 | modLen | prime | Prime |
| ? | modLen | key | Server Public Key | ? | modLen | generator | Generator |
|   |   |   |   | ? | modLen | key | Server Public Key |

JCP 1.7 (ultra-lite)        JCP 1.8 (enhanced/power)

Y (89 dec - 59 hex) - Server Key

A server key is sent to the client to pass the RC4 encryption key to
be used for inbound traffic. This message is encrypted with the
outbound RC4 key before it is sent. server key has the following
format:

| Offset | Length | Value | Description | Offset | Length | Value | Description |
|---|---|---|---|---|---|---|---|
| 0 | 1 | Y | Command | 0 | 1 | Y | Command |
| 1 | 5 | key | Session Key | 1 | 1 | key | Session Key |

020758.020                                              PATENT APPLICATION

44 length  Length 2    key       key   Session Key
                          length JCP 1.7 (ultra-lite)        JCP 1.8 (enhanced/power)

p (112 dec - 70 hex) - Print Data

A print data request is sent to the client to print data on the
     printer. A print data request has the following format:

Offset Length  Value  Description 0      1       p      Command 1      1       command Print Subcommands 2      ?       command Subcommand Params The Print Subcommands are defined as follows:

S = Start Print Job
         Param[0] = 1-byte mode indicator: 0=normal 1=raw mode
     D = Set Print Density
         Param[0] = 1-byte line density value in standard typographic
         points (one point = 1/72 inch).
         Param[1] = 1-byte character density value in characters per
         inch (CPI).
     E = End Print Job
     F = Form Feed
     R = Request Response - 2 byte Sequence Number (HI|LO)

T (84 dec - 54 hex) - WebConnect Protocol Message

A webconnect protocol message request is sent to the client to display
     a message. A webconnect protocol message request has the following
     format:

Offset    Length      Value    Description 0         1           T        Command 1         2           command  Subcommands

| 3 | 2 | message length | Message Length |
|---|---|---|---|
| 5 | message length | message | Message |

The Subcommands are defined as follows:

```
0001 = GUICFG
0002 = File Transfer
0003 = (not defined)
0004 = RTM
0005 = Secure ID
``` q (113 dec - 71 hex) - Allow User Configuration State

A allow user configuration state request is sent to the client to allow or disallow user configuration. A allow user configuration state request has the following format:

Offset Length Value Description

| 0 | 1 | q | Command |
|---|---|---|---|
| 1 | 1 | state | 0 = Do not allow local configuration<br>1 = Allow local configuration | y (121 dec - 79 hex) - I Am Here. (Are You There Response)

A i am here request is sent to the client to in response to the Are You There command. A i am here request has the following format:

Offset Length Value Description

| 0 | 1 | y | Command |
|---|---|---|---| z (122 dec - 7A hex) - Data Compression Enabled

Informs Java client that Data Compression will be used on the current session.
NOTE: Only supported on Enhanced and Power User sessions.

Offset Length Value Description

| 0 | 1 | z | Command |
|---|---|---|---| i (105 dec - 69 hex) - Ping Echo (Pong)

The reponse to an applet Ping. The Ping Echo (Pong) has the following format:

Offset Length  Value Description 0    1    i    Command

What is claimed is:

1. A computer-implemented terminal session emulator for providing browser-based access to legacy host applications, comprising:

an emulation server operable to negotiate a persistent connection between a legacy host system and a client system, said emulation server further in communication with a web server; and applet code operable to create an applet process executing under a web browser on a client system, said applet code being downloadable from the web server to the client system in response to receiving a uniform resource locator associated with the legacy host system, and, when executed by the client system, the applet process operable to communicate with said emulation server to provide a terminal session to a user of the client system via said persistent connection;

wherein said emulation server is further operable to handle protocol conversions of response time signals in data streams communicated between said applet process and said host system.

2. The emulator of claim 1, wherein the persistent connection is established by means of a protocol that handles communications between said applet process and said emulation server.

3. The emulator of claim 1, wherein said response time signals are TELNET timing marks.

4. The emulator of claim 1, further comprising said web server.

5. The emulator of claim 1, wherein said emulation server is implemented on said legacy system.

6. The emulator of claim 1, where said emulation server communicates with said legacy host system via a TN interface associated with said legacy host system.

7. The emulator of claim 1, wherein the applet code comprises executable code for a JAVA applet to be executed under a JAVA-capable web browser.

8. The emulator of claim 1, wherein the persistent connection is a persistent TCP/IP connection.

9. The emulator of claim 1, further comprising a client thread at said emulation server operable to provide both upstream and downstream communications.

10. The emulator of claim 1, wherein the emulation server is operable to communicate using a 3270 data flow and the applet process is operable to provide a 3270 type terminal session.

11. The emulator of claim 1, wherein the emulation server is operable to communicate using a 5250 data flow and the applet process is operable to provide a 5250 type terminal session.

12. The emulator of claim 1, wherein the emulation server is operable to communicate using an NOT data flow and the applet process is operable to provide an NOT type terminal session.

13. The emulator of claim 1, wherein the emulation server is operable to communicate using a VT220 data flow and the applet process is operable to provide a VT220 type terminal session.

14. The emulator of claim 1, wherein said emulation server receives said legacy data stream in accordance with a TN protocol.

15. The emulator of claim 1, wherein said emulation server receives said web browser data stream in accordance with a HTTP protocol.

16. A computer-readable medium whose contents are a gateway process that causes a gateway to monitor response times from a client terminal emulation system, the gateway being associated with a host legacy system, by performing the steps of:

receiving a request for response time monitoring from said host system;

negotiating a persistent connection between an emulation server and said host;

inserting an outgoing response time signal into data streams from said host system; and monitoring the time for an incoming response time signal to be received from a browser-based applet process executing on said client system.

17. The medium of claim 16, wherein said persistent connection is via an emulation server in communication with said web server.

18. The medium of claim 16, wherein said emulation server performs protocol conversions for said response timing signals between a protocol associated with said gateway and a protocol associated with said client system.

19. The medium of claim 16, wherein the persistent connection is a persistent TCP/IP connection.

20. The medium of claim 16, wherein the client system is operable to provide a 3270 type terminal session.

21. The medium of claim 16, wherein the client system is operable to provide a 5250 type terminal session.

22. The medium of claim 16, wherein the client system is operable to provide an NOT type terminal session.

23. The medium of claim 16, wherein the client system process is operable to provide a VT220 type terminal session.

24. The medium of claim 16, wherein the gateway is a TN server gateway.

25. The medium of claim 24, wherein said response time signals are TELNET timing marks.

26. A method for monitoring response times of a client terminal emulation system in persistent connection to a legacy host system, comprising:

executing an applet process under a web browser on the client system in response to selection of a uniform resource locator associated with a legacy host system;

connecting the applet process to the legacy host system across a persistent connection;

inserting an outgoing response timing signal into a data stream from a gateway associated with said host;

communicating between the applet process and the legacy host system across the persistent connection; and receiving, at said gateway, an incoming response timing signal from said client system.

27. The method of claim 26, further comprising downloading executable code for the applet process to the client system in response to the selection of a uniform resource locator associated with the legacy host system.

28. The method of claim 26, wherein connecting the applet process to the legacy host system is accomplished using an emulation server, and wherein said emulation server performs protocol conversions to a protocol associated with said applet process.

29. The method of claim 26, wherein communicating between the applet process and the legacy host is accomplished using a data flow based upon a communication protocol associated with said applet process.

30. The method of claim 26, wherein executing the applet process comprises executing a JAVA applet under a JAVA-capable web browser.

31. The method of claim 26, wherein providing a terminal session comprises providing a 3270 type terminal session.

32. The method of claim 26, wherein providing a terminal session comprises providing a 5250 type terminal session.

33. The method of claim 26, wherein providing a terminal session comprises providing an NOT type terminal session.

34. The method of claim 26, wherein providing a terminal session comprises providing a VT220 type terminal session.

35. The method of claim 26, wherein the gateway is a TN server and said response timing signals are TELNET timing marks.

* * * * *